United States Patent
Saad et al.

(10) Patent No.: US 12,182,807 B2
(45) Date of Patent: Dec. 31, 2024

(54) INTERFACE FOR CONSTRUCTING SMART PROTOCOLS FOR EXECUTION ON BLOCKCHAIN PLATFORMS

(71) Applicant: PayPal, Inc., San Jose, CA (US)

(72) Inventors: Muhammad Saad, Scottsdale, AZ (US); Raoul Johnson, Scottsdale, AZ (US); Jakub Burgis, Scottsdale, AZ (US)

(73) Assignee: PayPal, Inc., San Jose, CA (US)

( * ) Notice: Subject to any disclaimer, the term of this patent is extended or adjusted under 35 U.S.C. 154(b) by 260 days.

(21) Appl. No.: 17/654,751

(22) Filed: Mar. 14, 2022

(65) Prior Publication Data
US 2023/0289790 A1   Sep. 14, 2023

(51) Int. Cl.
*G06Q 20/38* (2012.01)
*G06Q 20/40* (2012.01)
*H04L 69/00* (2022.01)
*G06Q 40/04* (2012.01)

(52) U.S. Cl.
CPC ....... *G06Q 20/389* (2013.01); *G06Q 20/4016* (2013.01); *H04L 69/03* (2013.01); *G06Q 40/04* (2013.01)

(58) Field of Classification Search
None
See application file for complete search history.

(56) References Cited

U.S. PATENT DOCUMENTS

| | | | |
|---|---|---|---|
| 10,924,363 B2 | 2/2021 | Pan et al. | |
| 11,260,304 B1 * | 3/2022 | Koch | A63F 13/537 |
| 11,669,830 B2 * | 6/2023 | Margolis | G06Q 40/04 |
| | | | 705/41 |
| 2017/0352027 A1 | 12/2017 | Zhang et al. | |
| 2019/0334726 A1 * | 10/2019 | Kelly | H04L 9/3247 |
| 2020/0225974 A1 | 7/2020 | Davis et al. | |
| 2022/0067752 A1 | 3/2022 | Fang et al. | |
| 2023/0222531 A1 * | 7/2023 | Cella | G06Q 10/06315 |
| | | | 705/7.31 |
| 2023/0342849 A1 * | 10/2023 | Doney | G06Q 20/3678 |

FOREIGN PATENT DOCUMENTS

| | | |
|---|---|---|
| WO | 2018205730 A1 | 11/2018 |
| WO | 2019201246 A1 | 10/2019 |

OTHER PUBLICATIONS

International Search Report and Written Opinion for Application No. PCT/US2023/063824 mailed on Jul. 21, 2023, 13 pages.

* cited by examiner

*Primary Examiner* — Jamie R Kucab
(74) *Attorney, Agent, or Firm* — Kowert, Hood, Munyon, Rankin & Goetzel, P.C.; Scott W. Pape; Dean M. Munyon

(57) ABSTRACT

A method for generating a smart protocol includes providing, by a server computer system, a user interface to one or more of a plurality of users. The server computer system may receive, via the user interface, input specifying terms corresponding to a smart protocol that is to be deployed on a particular blockchain platform. The specified terms may include the plurality of users associated with the smart protocol and a web resource to be used to identify one or more external data. An execution of the smart protocol may be based on a value of the external data. Based on the specified terms, the server computer system may generate, without further input from the plurality of users, the smart protocol. The server computer system may deploy the smart protocol to the particular blockchain platform.

20 Claims, 10 Drawing Sheets

500

---

Providing, by a server computer system, a user interface to one or more of a plurality of users.
510

↓

Receiving, by the server computer system via the user interface, input specifying terms corresponding to a smart protocol that is to be deployed on a particular blockchain platform, the specified terms including the plurality of users associated with the smart protocol and a web resource to be used to identify one or more external data.
520

↓

Based on the specified terms, generating, by the server computer system without further input from the plurality of users, the smart protocol that is executable based on the value of the external data.
530

↓

Deploying, by the server computer system, the smart protocol to the particular blockchain platform, wherein the smart protocol:
540

> Causes the web resource to be monitored to determine the value of the external data.
> 544

> In response to the value of the external data corresponding to a first value, executes to cause an electronic exchange to be performed on the particular blockchain platform.
> 548

```
┌─────────────────────────────────────────────────────────────┐
│ Providing a user interface to one or more of a plurality of │
│ users, enabling a first of the plurality of users to specify│
│ terms for a smart protocol that executes on a particular    │
│ blockchain platform, the terms including identifiers for the│
│ plurality of users and a web resource to be used to         │
│ identify one or more external data.                         │
│ 910                                                         │
└─────────────────────────────────────────────────────────────┘
                              │
                              ▼
┌─────────────────────────────────────────────────────────────┐
│ Identifying one or more data variables available from the   │
│ web resource.                                               │
│ 920                                                         │
└─────────────────────────────────────────────────────────────┘
                              │
                              ▼
┌─────────────────────────────────────────────────────────────┐
│ Based on the specified terms and the available data         │
│ variables, generating the smart protocol using no further   │
│ input from the plurality of users.                          │
│ 930                                                         │
└─────────────────────────────────────────────────────────────┘
                              │
                              ▼
┌─────────────────────────────────────────────────────────────┐
│ Deploying the smart protocol to the particular blockchain   │
│ platform for execution, the execution including:            │
│ 940                                                         │
│  ┌───────────────────────────────────────────────────────┐  │
│  │ Comparing current values of the available data        │  │
│  │ variables from the web resource to respective ones of │  │
│  │ the specified terms.                                  │  │
│  │ 944                                                   │  │
│  └───────────────────────────────────────────────────────┘  │
│  ┌───────────────────────────────────────────────────────┐  │
│  │ Based on the comparing, causing one or more electronic│  │
│  │ exchanges on the particular blockchain platform.      │  │
│  │ 948                                                   │  │
│  └───────────────────────────────────────────────────────┘  │
└─────────────────────────────────────────────────────────────┘
```

INTERFACE FOR CONSTRUCTING SMART PROTOCOLS FOR EXECUTION ON BLOCKCHAIN PLATFORMS

BACKGROUND

Technical Field

Embodiments described herein are related to the field of blockchain platforms, and more particularly to development of smart protocols for execution on blockchain platforms.

Description of the Related Art

Some blockchain platforms may include capabilities for users of the platform to develop smart protocols between themselves and other users. As used herein, a "smart protocol" is a software program or script that, based on provided inputs, determines one or more results and performs one or more electronic exchanges based on these one or more results. Smart protocols are developed using a programming language that may be specific to a given blockchain platform. In order for two or more parties to engage in a smart protocol, all parties should be adept at the associated programming language and blockchain platform complexities. Additionally, the parties may be expected to be capable of independently conducting logic validation, determining syntax correctness, and determining semantic security of the smart protocol.

Furthermore, issues related to establishing a correct exit point for the smart protocol may exist. For example, a smart protocol may be configured to query a particular web site after a particular point in time to retrieve input for determining results. At the time of the query, if the website goes down (e.g., the site is hacked by a deceitful party), then the other party may not benefit from the correct execution of the smart protocol. One solution to prevent loss from such a situation may be to enable the smart protocol to cancel any associated electronic exchanges and to return any collateral provided by either party back to the respective party.

BRIEF DESCRIPTION OF THE DRAWINGS

The following detailed description makes reference to the accompanying drawings, which are now briefly described.

FIG. 5 shows a flow diagram of an embodiment of a method for generating a smart protocol.

FIG. 9 depicts a flow diagram of an embodiment of another method for generating a smart protocol.

DETAILED DESCRIPTION OF EMBODIMENTS

Figure 1:
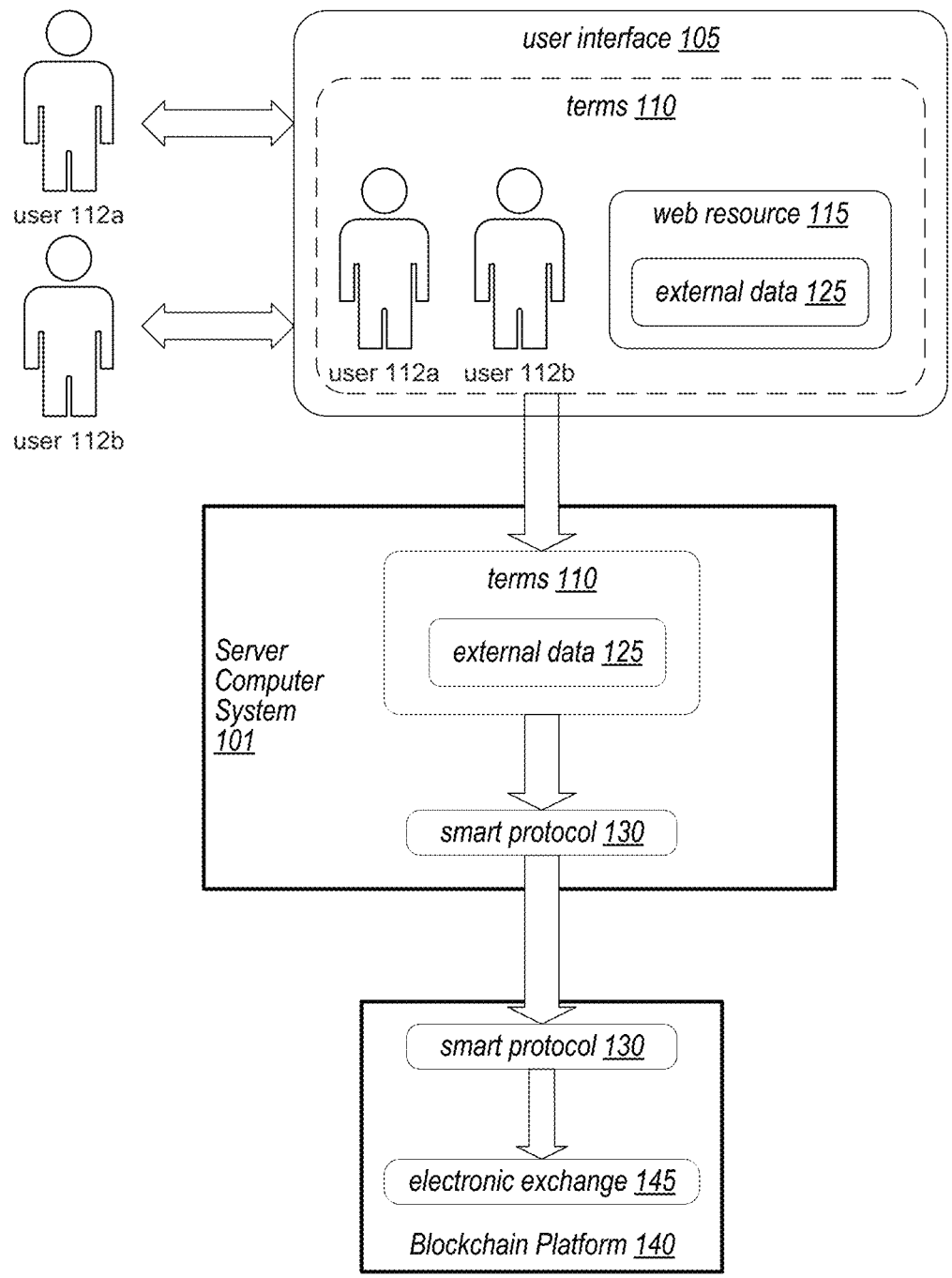
FIG. 1 illustrates a block diagram of an embodiment of a system for generating a smart protocol.

Use of smart protocols may be limited to a relatively small number of users due to a couple of reasons. To generate and use smart protocols, users may need to understand a programming language of a particular blockchain platform as well as understand protocol construction to establish a proper exit point for the protocol for fair distribution to prevent loss to one party or another. Overcoming such issues may make smart protocols available to a wider variety of users. While users may be taught the necessary programming skills to construct a smart protocol, some users may not have the time, desire, and/or background to develop such skills. In regards to preventing loss, one solution may be to enable the smart protocol to cancel any associated electronic exchanges and to return any collateral provided by either party back to the respective party. While this approach may prevent loss, it does not guarantee fair distribution of submitted collateral. In a fair distribution, a protocol is executed per specified terms. Returning to an initial state may prevent one party from receiving just benefits.

Understanding the benefit users may receive from having the capability to utilize smart protocols, also referred to herein as "smart contracts," the present inventors propose a framework that may extend the use of smart protocols to users who do not possess adequate programming skills and/or understanding of establishing proper exit points. A smart protocol development platform is proposed that abstracts the smart protocol functionality from a complex programming language and directs development to a more intuitive user interface. Using such an interface, a user may not have to write any code to create a smart protocol. Smart protocol creation, validation, execution, and notification may then be enabled for end users, without any need for skills traditionally required to maintain a blockchain.

Furthermore, the smart protocol development platform may further provide a "fair execution" to a smart protocol even when one of the parties is adversarial. For example, the adversarial party may attack a web site that is to be queried as part of execution of the smart protocol, thereby preventing the smart protocol from accessing information associated with agreed upon terms that determine a result of the protocol's execution. At this time, blockchain platforms typically do not support a backup mechanism for query failures. The smart protocol development platform may, however, determine a backup query mechanism that is unknown to the parties of the smart protocol. The parties may not be aware of the backup mechanism and therefore cannot attack the backup source of information. Once the smart protocol is deployed to a blockchain, the smart protocol development platform may not be able to modify any information in the smart protocol. Accordingly, the users may leverage the benefits of self-enforcing and autonomous smart protocols as well as the guarantee of fair benefit distribution.

The proposed smart protocol development platform may provide a user interface to one or more of a plurality of users, allowing the users to provide input that specifies terms corresponding to a smart protocol that is to be deployed on a particular blockchain platform. These specified terms may include a web resource to be used to identify one or more external data to be used to determine results generated by the smart protocol. Based on the specified terms, the smart protocol development platform may generate, without further input from the plurality of users, the smart protocol that is then deployed to the particular blockchain platform. The smart protocol may cause the web resource to be monitored to determine the value of the external data. In response to the value of the external data corresponding to a particular value, the smart protocol executes, causing an electronic exchange to be performed on the particular blockchain platform.

Such a smart protocol development platform may provide users with ease of protocol creation, testing/validation of the created protocol for proper operation, analysis of the protocol for susceptibility to attacks, as well as autonomous execution and notification of the protocol. These benefits may allow a wider population of users to utilize smart protocols, including generating more secure protocols that result in successful execution and fair distribution of benefits.

A block diagram for an embodiment of a system is illustrated in FIG. 1. As shown, system 100 includes server computer system 101 and blockchain platform 140. Server computer system 101 receives terms 110 from users 112a and 112b (collectively users 112) and generates smart protocol 130. Server computer system 101 may then send smart protocol 130 to blockchain platform 140.

As illustrated, server computer system 101 provides user interface 105 to users 112. User interface 105 may be accessed by one or more of users 112 via a respective client computer (not shown). In various embodiments, user interface 105 may be implemented as a stand-alone application executed on the client computer, via a web browser accessing a web page hosted by server computer system 101, via an applet (e.g., a java applet downloaded to the client computer, or by any other suitable technique. One of users 112 (e.g., user 112a) uses user interface 105 to generate input for constructing smart protocol 130, including terms 110.

Server computer system 101, as shown, may be an enterprise computer system, or a portion thereof. In various embodiments, server computer system 101 may include a single computer system or a plurality of computer systems, such as a server farm. In some embodiments, server computer system 101 may be a subset of bandwidth of a server farm leased from a third party, e.g., a virtual computer. Server computer system 101 receives, via the user interface, input specifying terms 110 corresponding to a smart protocol that is to be deployed on blockchain platform 140. Terms 110 include identifying information for users 112 associated with the smart protocol and identifying information for web resource 115. Web resource 115 may be any suitable form of Internet accessible source of information, such as a web site, database, cloud computing application, and the like. Web resource 115 may be used to identify one or more external data 125 such that an execution of the smart protocol is based on a value of external data 125.

Blockchain platform 140 may, in some embodiments, be a third-party platform, such as Ethereum, Polkadot, Solana, EOS, Binance Smart Chain, and the like. Server computer system 101 may have access to these platforms and include libraries and other coding tools to generate a smart protocol code for one or more of these blockchain platforms. In other embodiments, blockchain platform 140 may be operated by a same entity as server computer system 101.

As an example, users 112 may desire to create a smart protocol that executes a wager between the two users regarding the outcome of an event, such as a football game. In such an example, terms 110 may include various aspects of the wager including date and time of the game, the teams that are playing, identity of the users and which team each has selected. Additional terms may include a type of wager or wagers (e.g., a straight win versus a point spread, over/under bets on the combined scores, and the like). Web resource 115 in this example may be a uniform resource locator (URL) for any of a number of sports web sites that can provide box scores for the game after the game is over. Terms 110 may further include details of collateral being wagered by each of users 112. For example, blockchain platform 140 may be associated with a particular cryptocurrency, and each of users 112 may have accounts on blockchain platform 140 with available balances that can be secured for the wager. In other embodiments, other digitally tradeable items such as non-fungible tokens (NFTs), media files, data files, and the like may be used as collateral for the wager.

Based on terms 110, server computer system 101 generates, without further input from users 112, smart protocol 130 that is executable based on the value of external data 125. User 112a utilizes user interface 105 to enter terms 110 that specify details of the desired smart protocol to be entered between user 112a and user 112b. Server computer system 101 uses these details to generate smart protocol 130 that includes code that is executable on blockchain platform 140. User interface 105 may enable user 112a to enter terms 110 without requiring user 112a to have any knowledge or skills associated with a programming language used by blockchain platform 140.

After the generation, server computer system 101 deploys smart protocol 130 to blockchain platform 140. The executable code generated as part of smart protocol 130 is deployed to blockchain platform 140. In some embodiments, smart protocol 130 may be implemented solely as executable code on blockchain platform 140. In other embodiments, additional code and/or information may be stored and/or executed within server computer system 101 or another computer system (not illustrated) associated with server computer system 101. The deployment may, in some embodiments, include compiling smart protocol 130 to generate an executable file specific to blockchain platform 140, while, in other embodiments, the generated code may be a script that is compiled at run-time.

In some embodiments, server computer system 101 may validate smart protocol 130 for susceptibility to known attacks prior to the deploying. Since the collateral used in a smart protocol may include items of value, server computer system 101 may analyze the generated smart protocol 130 for weaknesses to any known forms of attack. For example, buffer overflow and reentrancy are two types of know attacks that may be used to cause improper operation of code execution. Server computer system 101 may, for example, generate a copy of smart protocol 130 and simulate execution as if smart protocol 130 were being executed on blockchain platform 140. This simulation may be performed multiple times with various forms of attack instigated for each performance. Failure during any such simulation may cause server computer system 101 to regenerate smart protocol 130 with revisions to mitigate the successful attacks. In other embodiments, server computer system 101 may issue a security report to user 112a (and optionally to user 112b) alerting the user of the potential susceptibility, and may further include (if available) recommended edits to address the issue(s).

In addition to (or in place of) validating smart protocol 130 for susceptibility to a malicious attack, server computer system 101 may also check smart protocol 130 for weaknesses to known issues (e.g., server down time, high traffic/high latency communications, and so forth), that may not be inherently malicious, but could cause a failure of the smart protocol to execute correctly with a fair distribution of the collateral. Furthermore, server computer system 101 may analyze smart protocol 130 for potential optimizations of generated code. For example, some blockchain platforms may charge fees that are based on a number of instructions in the generated code, and/or by an amount of computing bandwidth that execution of smart protocol 130 consumes. Code optimization may provide a cost savings to users 112 as well as reduce an amount of resources used on blockchain platform 140.

In response to determining that the susceptibility of smart protocol 130 is below a threshold level, server computer system 101 deploys smart protocol 130 to blockchain platform 140. Server computer system 101 may determine a security score for smart protocol 130 and compare this score to a threshold level. If the threshold is satisfied (e.g., below a maximum tolerable level of risk, or above a minimum level of safety) then server computer system 101 deploys smart protocol 130 onto blockchain platform 140. Deployment of smart protocol 130 may cause web resource 115 to be monitored to determine a current value of external data 125. In response to the value of external data 125 corresponding to a first value, smart protocol 130 executes to cause electronic exchange 145 to be performed on blockchain platform 140.

Returning to the football wager example, after smart protocol 130 has been generated, validated, and deployed on blockchain platform 140, smart protocol 130 may remain idle until the date and time that the game is played. In other embodiments, a process (on server computer system 101 or on blockchain platform 140) may periodically check to determine if the game has been played. At some point after the game has completed, web resource 115 updates external data 125 with various details of the game, including the score for each team. Smart protocol 130 causes web resource 115 to be accessed and external data 125 to be read. Based on these values of external data 125, smart protocol 130 causes electronic exchange 145 to be performed, which, if user 112b wins the wager, may include a transfer of the collateral of user 112a to an account of user 112b. In some embodiments, electronic exchange 145 may include multiple transfers. For example, users 112 may make multiple wagers (straight up score, over/under on total points, first team to score, etc.), resulting in an electronic exchange for each wager.

Use of a smart protocol development platform such as described in FIG. 1, may enable users to utilize smart protocols who otherwise may not have the knowledge and/or skills to properly generate smart protocols. In addition, security and optimization capabilities of such a system may reduce bandwidth consumed on blockchain platforms by generating efficient code that is resistant to attacks. Presently, the bandwidth consumed by usage of blockchains and smart protocols consumes a nontrivial amount of energy. Creating more efficient protocols that are resistant to attack may make execution of the smart protocols fast and efficient, thereby reducing energy usage.

It is noted that system 100 as illustrated in FIG. 1 is merely an example of a smart protocol development platform. FIG. 1 has been simplified to highlight features relevant to this disclosure. In other embodiments, additional elements that are not shown may be included, and/or different numbers of the illustrated elements may be included. For example, although two users have been shown for clarity, any suitable number of users may be included in a smart protocol. More than one blockchain platform and/or web resource may be utilized in some embodiments. Additional third-party entities (not shown) may be included, such as an entity associated with an NFT that is used as collateral by one or more users.

The system illustrated in FIG. 1 is described as using external data from a web resource in conjunction with the performance of a smart protocol. Such external data may include a variety of possible information collected in various ways. An example of parsing elements from a web resource for use in generation of a smart protocol is shown in FIG. 2.

Figure 2:
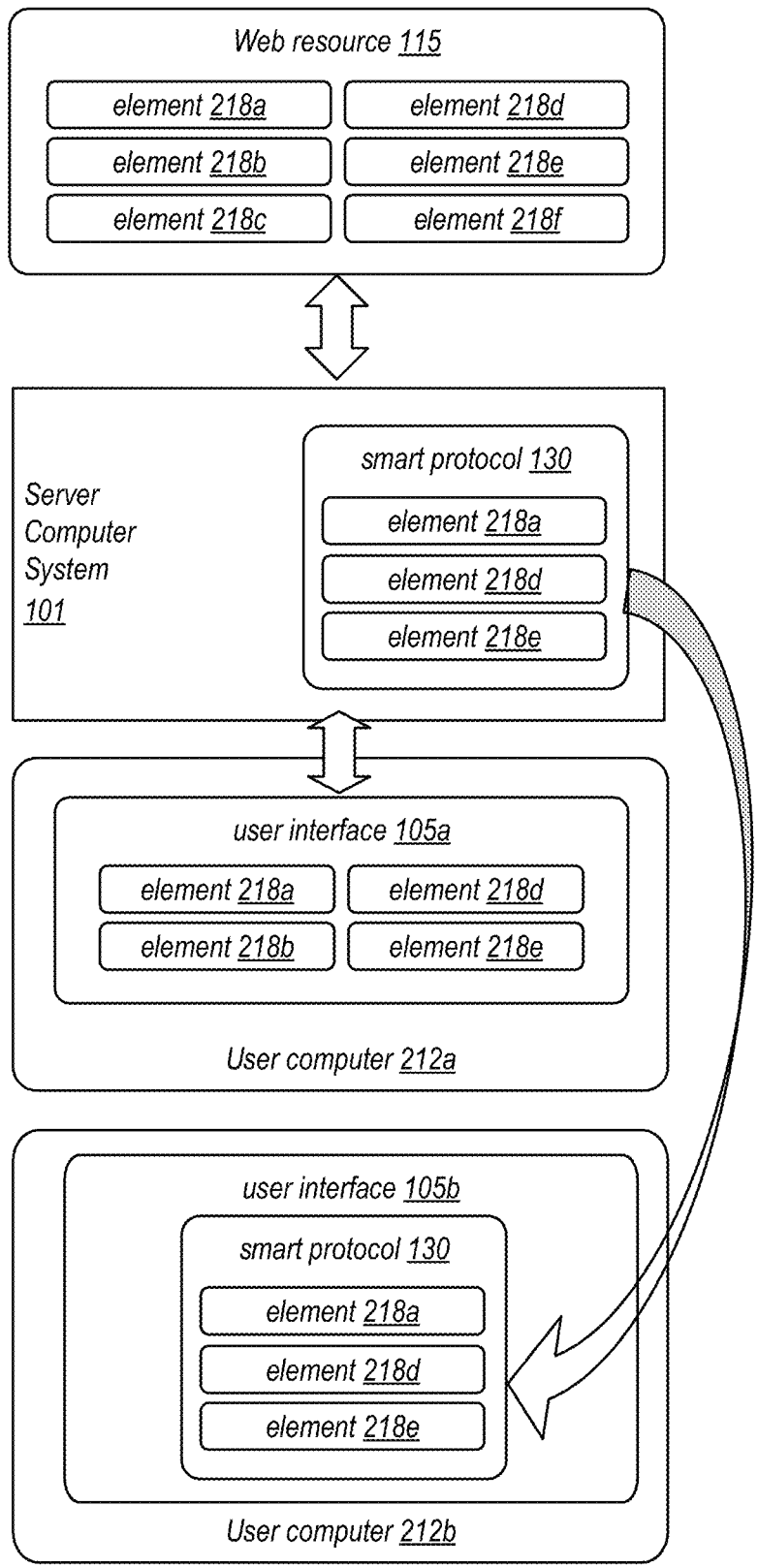
FIG. 2 shows a block diagram of an embodiment of a system for generating a smart protocol using elements from a web resource.

Moving to FIG. 2, a block diagram of an embodiment of a system that detects and then uses elements from a web resource for generating a smart protocol is shown. As illustrated, system 200 includes server computer system 101 coupled to web resource 115 and user computers 212a and 212b (collectively user computers 212). Server computer system 101 determines that elements 218a-218f (collectively elements 218) are available in web resource 115 and shares at least a portion of these elements 218 with user computers 212.

As described above, external data 125 is used, by server computer system 101 to develop smart protocol 130. An example of retrieving and using external data includes parsing, by server computer system 101, web resource 115 to generate a plurality of elements 218 that are associated with external data 125. For example, server computer system 101 may visit web resource 115, including one or more web pages associated with web resource 115, parse hypertext markup language (HTML) code (or other included/linked code) included with the one or more web pages, and identify variables or other indications of content that web resource 115 will present after a conclusion of the game. In some embodiments, web resource 115 may include a template web page that includes indications of box scores and/or other content that will be available after the game concludes. In other embodiments, web resource 115 may include web pages for other games that have concluded, and server computer system may use the web pages for these other games as an example of the post-game information expected to be available for the game associated with the wager.

Server computer system 101 may present a subset of elements 218 for selection by a first user of users 112 (e.g., user 112a). As shown, server computer system 101 presents elements 218a, 218b, 218d, and 218e to user interface 105 that is operating on user computer 212a associated with user 112a. Elements 218c and 218f may represent data that is not relevant to a wager (e.g., metadata associated with web resource 115) and, therefore, are not presented. The remaining elements 218a, 218b, 218d, and 218e may be identified as having potential interest to users making a wager on a football game. The subset of elements 218, as well as various operators for construction of conditions associated with the elements, are presented to user 112a via user interface 105a. For example, user interface 105a may be a graphical interface that allows user 112a to click on the various elements and operators to visually construct conditions to be implemented in smart protocol 130. Text boxes may be used to enter any relevant information or terms that are not available as graphical elements, such as contact information for each user included in smart protocol 130.

After presenting the subset of elements 218 to user interface 105a, user 112a may view the elements and select one or more for use in smart protocol 130 as described. As shown, user 112a selects elements 218a, 218d, and 218e which, for example, may correspond, respectively, to an indication of which team scores first in the game, a final score for Team A, and a final score for Team B. User 112a, via user interface 105a, may include other details of the wagers between user 112 and user 112b. User interface 105a may provide options for establishing conditions related to the selected elements 218. For example, user 112a may set a first condition that user 112a receives a first portion of the wagered collateral if element 218d (Team A final score) is greater than element 218e (Team B final score), a second condition that user 112b receives the wagered collateral if element 218d is less than element 218e, and a third condition that respective portions of the wagered collateral are returned their initial owners if elements 218d and 218e are equal. A second portion of the wagered collateral may be linked to additional conditions related to which team is indicated by element 218a (first team to score).

In response to receiving indications of the selected elements 218a, 218d, and 218e, as well as related conditions, from user 112a via user interface 105a, server computer system 101 generates smart protocol 130 using the selected ones of elements 218, and related conditions. In some embodiments, server computer system 101 may generate code for smart protocol 130 in a language that is native to blockchain platform 140 that will be used to implement smart protocol 130. In other embodiments, server computer system 101 may generate the code for smart protocol 130 in an intermediate language (e.g., Java, C++, a proprietary language of server computer system 101, and the like), and then translated into the native language for the destination blockchain platform 140. Use of an intermediate language may allow for easy conversion of smart protocol 130 into the native language of any blockchain platform supported by server computer system 101.

In various embodiments, server computer system 101 may analyze a susceptibility of smart protocol 130 to known operational issues before or after the code generation. For example, the selected elements 218 and conditions provided by user 112a may be evaluated for susceptibility to known attacks and/or operational bugs in a similar manner as described above in regards to FIG. 1, prior to code generation. In other embodiments, a version of smart protocol 130 implemented in an intermediate language may be evaluated. Using an intermediate language may allow server computer system 101 to map know issues to a single program language, which may allow updates based on newly discovered bugs or attacks to be quickly rolled out for use by server computer system 101. In some embodiments, the analysis may be performed on the final code native to the selected blockchain platform 140. Analysis of the final code may provide a most accurate determination whether issues are present since some attacks and/or bugs may be unique to a given blockchain platform.

As illustrated, server computer system 101 presents smart protocol 130 to at least a second user of users 112 (e.g., user 112b) for approval. After user 112a has submitted details for the generation of smart protocol 130, these details are presented to user 112b via user interface 105b. For example, in various embodiments, the details may be presented to user 112b before or after the generation of code for smart protocol 130. In embodiments in which user interface 105 is a graphical user interface, user interface 105b may illustrate smart protocol 130 using similar graphical elements as were selected by user 112a in user interface 105a. These elements may be presented in a similar manner as were arranged by user 112a to represent the desired conditions that are to be executed by blockchain platform 140. Use of such a graphical interface may allow both users 112a and 112b to generate and comprehend smart protocol 130 while having little to no programming experience.

User 112b may further be provided with respective interface buttons, or other types of elements, to allow user 112b to accept or reject the presented smart protocol 130. In the case of rejection, user 112b may be further provided with graphical elements and/or a text box to indicate one or more reasons for the rejection, and may further allow user 112b to indicate desired changes that would result in user 112a approving smart protocol 130. For example, rather than a straight comparison of team scores to determine a winner in the wager example, user 112b may indicate that they will approve smart protocol 130 if a point spread is included with the score determinations. In some embodiments, after user 112b approves smart protocol 130, both users 112a and 112b may provide information about their respective collateral (e.g., cryptocurrency from respective accounts) that will allow the execution of smart protocol 130 to fairly distribute the wagered collateral to the deserving user.

Server computer system 101 deploys smart protocol 130 to blockchain platform 140 after receiving approval from user 112b. After user 112b has approved smart protocol 130, and after server computer system 101 has validated that a susceptibility to attack and/or bug issues is below a threshold level, then smart protocol 130 is deployed to blockchain platform 140. This deployment may, for example, include copying some or all of code generated by server computer system 101 for smart protocol 130 to blockchain platform 140, which may be implemented on a different computer system than server computer system 101. In some embodiments, blockchain platform 140 executes smart protocol 130 at a suitable point in time, e.g., after receiving a notification that the football game in question has concluded, or in in response to an indication that web reference 115 has valid post-game values for elements 218. In other embodiments, a portion of smart protocol 130 may be executed in server computer system 101, e.g., in response to the indication that web reference 115 has valid post-game values, and based on the values for the selected elements 218, cause blockchain platform 140 to execute its portion of smart protocol 130, including distribution of the wagered collateral.

In some embodiments, server computer system 101 may, in response to a successful deployment of smart protocol 130, save the elements and conditions of smart protocol 130 as a template for use with other users desiring a similar protocol. Server computer system 101 may provide user interface 105 to a different user. The generated smart protocol 130 may be presented, via user interface 105, to other users as a selectable option for use with different terms as determined by the different user. Reuse of successfully deployed smart protocols may further enable users with little to no programming experience to develop and use smart protocols that have been validated against attacks and/or bug issues, thereby increasing a reliability of execution of the deployed smart protocols, and reducing an amount of time and computer bandwidth that users utilize to develop and deploy smart protocols.

It is noted that the embodiment of FIG. 2 is merely an example to demonstrate the disclosed concepts. In other embodiments, a different combination of blocks may be included. For example, in the illustrated embodiment, web resource includes six elements, four of which are presented to user 112a for selection and three of which are then selected. In other embodiments, any suitable number of elements may be included in the web resource with any suitable subset of these elements presented to the users for selection.

Figure 3:
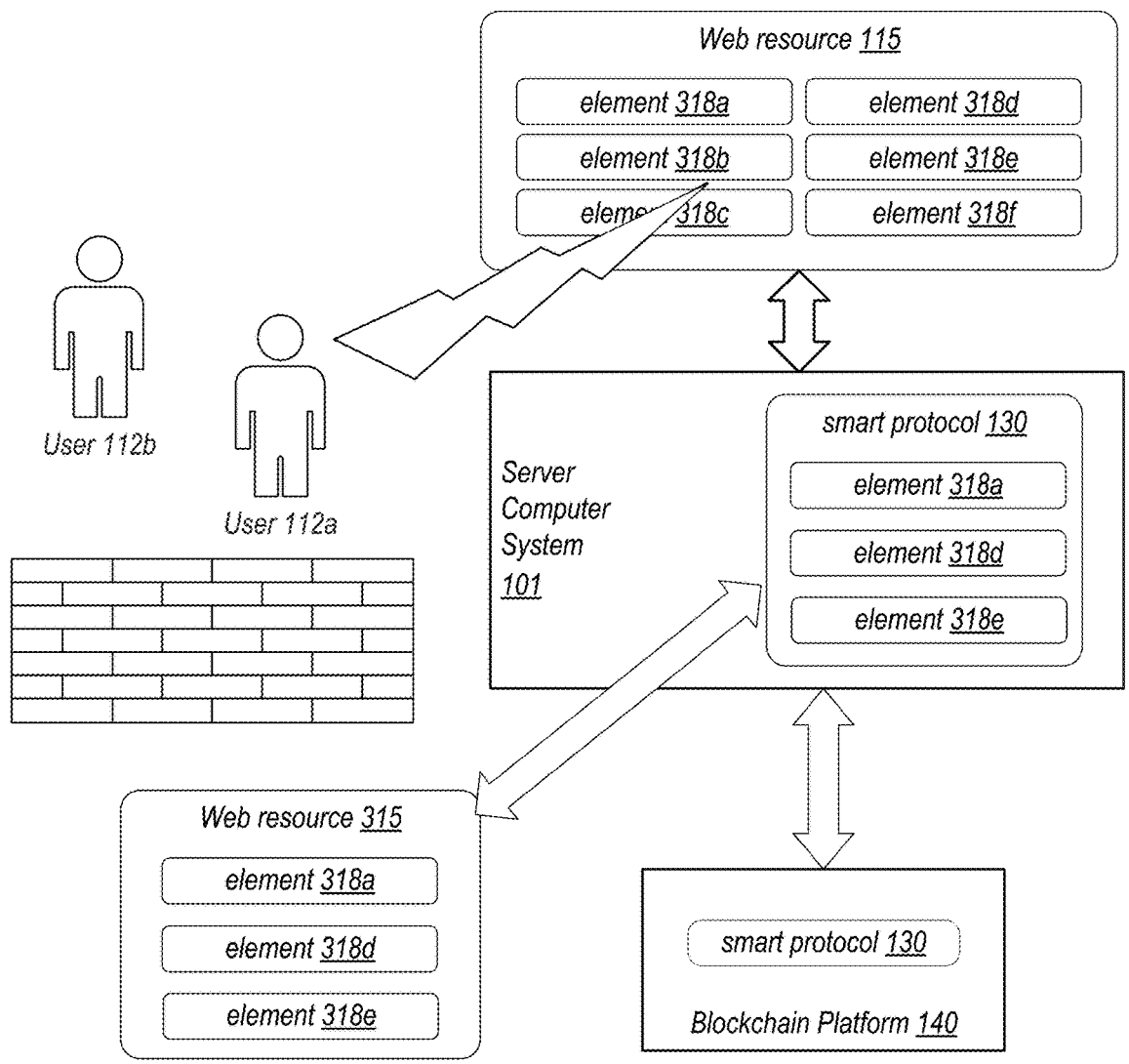
FIG. 3 depicts a block diagram of an embodiment of a system for generating a smart protocol that utilizes a secondary web resource.

FIGS. 1 and 2 illustrate techniques for developing a smart protocol using elements available from a particular web resource. Dependence on a single web resource, however, may be susceptible to an attack on that one web resource. If the identified web resource to be used for the smart protocol is hit with a denial-of-service or other form of attack at a time when the smart protocol is to be executed, then the information that the smart protocol uses to enable a fair distribution of collateral may be unavailable, thereby preventing the fair distribution. FIG. 3 provides an example of a system that includes a technique for mitigating reliance on a single web resource.

Turning to FIG. 3, a block diagram of an embodiment of a system that identifies a secondary web resource, in addition to a provided primary web resource, for generating a smart protocol is depicted. As shown, system 300 includes server computer system 101 coupled to web resource 115 and blockchain platform 140. System 300 further includes web resource 315 that is identified by server computer system 101 and is unknown to users 112.

As illustrated, server computer system 101 performs functions as described above in regards to FIGS. 1 and 2, including providing a user interface to user 112a and, in turn, receiving inputs from user 112a for developing smart protocol 130, including receiving information for accessing web resource 115 and its available elements 318a-318f that provide values for a plurality data variables. As described above, user 112a may select elements 318a, 318d, and 318e for use with smart protocol 130.

To mitigate reliance on a single source of these values for executing smart protocol 130, server computer system 101 identifies secondary web resource 315 that provides similar values for the plurality of data variables, including elements 318a, 318d and 318e. Since the elements to be used in smart protocol 130 are known, server computer system 101 may not need to identify a secondary web resource that includes all elements of web resource 115. Accordingly, web resource 315 may not include corresponding values for elements 318b, 318c, and 318f. Server computer system 101 may identify secondary web resource 315 from a cache of previously used (or otherwise known) web resources. In other embodiments, server computer system 101 may perform an Internet search to identify candidates for web resource 315 and then parse at least some of the candidates to determine which, if any, include elements 318b, 318c, and 318f. Candidates for web resource 315 may then be evaluated for susceptibility to attacks and, based on the evaluation, server computer system 101 selects one as web resource 315.

In order to avoid the potential for either of user 112a or user 112b to attack web resource 315, server computer system 101 withholds the identity of the secondary web resource 315 from users 112. If neither of users 112 knows an identity of web resource 315, then neither user is likely to attack web resource 315 in to avoid losing their collateral as a result of the execution of smart protocol 130. To help keep the identity of web resource 315 unknown to users 112, server computer system 101 encrypts a uniform resource locator (URL) for web resource 315 and stores the encrypted URL in a database. In some embodiments, for example, server computer system 101 may store the encrypted URL within blockchain platform 140, which may allow access to web resource 315 to both server computer system 101 and blockchain platform 140 while obscuring the identity to users 112.

After being deployed to blockchain platform 140, server computer system 101 (and/or blockchain platform 140 in some embodiments) monitors both the primary web resource 115 and the secondary web resource 315 to determine current values of elements 318a, 318d, and 318e. By monitoring both web resources, if web resource 115 is attacked at the time smart protocol 130 is to be executed, then web resource 315 may be available to provide the current values, thereby allowing smart protocol 130 to execute and fairly distribute the collateral provided users 112.

In some embodiments, server computer system 101 may determine a risk score for at least one of users 112. For example, one or both of users 112 may have an account associated with server computer system and, therefore, may have historical information available to server computer system 101 that enables the determination of a risk score. Such a risk score may provide an indication of a risk that the associated one of users 112 may attempt an attack on web resource 115 (or perform a different type of dishonest action) to avoid losing their provided collateral and/or unfairly gain ownership of the other user's collateral. Based on such a determined risk score, server computer system 101 may modify smart protocol 130. For example, if risk scores are determined for both users 112 and these determined risk scores indicate a very low risk of dishonest actions by either user, then server computer system 101 may skip identifying the secondary web resource 315.

It is noted that the system shown in FIG. 3 is merely an example to demonstrate the disclosed concepts. Some components have not been illustrated to increase clarity of the figure. Other embodiments may include additional components omitted in FIG. 3, such as user computers for each of users 112, network circuits for communicating between various computer systems, and the like.

Figure 4:
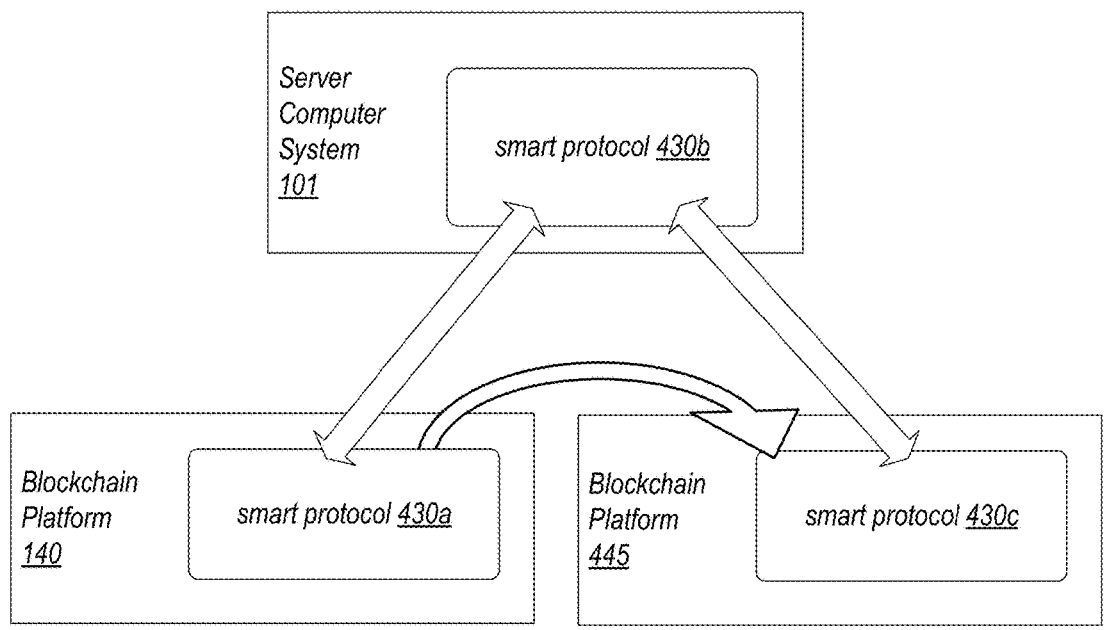
FIG. 4 illustrates a block diagram of an embodiment of a system for bridging execution of a smart protocol between two blockchain platforms.

FIGS. 1-3 have described aspects of the disclosed techniques for generating a smart protocol for deployment on a particular blockchain platform. Some blockchain platforms may require all users involved with a given smart protocol to each have an account on the particular blockchain platform in order to perform an electronic exchange in response to the execution of the smart protocol. In some embodiments, different users may wish to use different blockchain platforms. FIG. 4 illustrates an example in which more than one blockchain platform is included.

Moving now to FIG. 4, a system is depicted in which execution of a smart protocol includes an electronic exchange between two different blockchain platforms. In a similar manner as FIGS. 1-3, system 400 includes server computer system 101 and blockchain platform 140. In addition, system 400 includes blockchain platform 445. Smart protocol 430 is generated on server computer system 101 and includes, as shown, three portions: smart protocols 430a, 430b, and 430c. These respective portions 430a-430c are deployed to corresponding ones of server computer system 101 and blockchain platforms 140 and 445.

Similar to the descriptions disclosed above, server computer system 101 provides, to a first user of a plurality of users (e.g., users 112 in FIGS. 1-3), an interface for specifying terms for at least a portion of smart protocol 430. The terms may include identifiers for the plurality of users 112 and a web resource (e.g., web resource 115) that provides respective values for a plurality of data variables to be used in the execution of smart protocol 430. Smart protocol 430 is to be executed on blockchain platforms 140 and 445 as well as server computer system 101.

Server computer system 101 uses the specified terms and at least a subset of the plurality of data variables to generate smart protocol 430. The received terms may include elements from a web resource as well as conditions for distributing collateral provided by users 112 based on values of the elements at a future point in time (e.g., after the end of a football game). As previously described, server computer system 101 may be configured to generate smart protocol 430 with no further input from users 112 after the terms have been received.

After smart protocol 430 is generated, server computer system 101 deploys smart protocol 430, including sending smart protocol 430*a* to blockchain platform 140, and smart protocol 430*c* to blockchain platform 445. Smart protocol 430*b* is executed within server computer system 101. Based on current values of the subset of data variables, one or more of smart protocols 430*a*, 430*b*, and 430*c* may execute, causing one or more electronic exchanges on blockchain platforms 140 and/or 445. Deploying smart protocol 430 includes providing a bridge to execute at least one of the electronic exchanges from blockchain platform 140 to blockchain platform 445. In some embodiments, blockchain platform 140 may communicate directly to blockchain platform 445 (e.g., via the Internet) to perform an electronic exchange. In other embodiments, server computer system 101 may act as a mediator, performing one portion of an electronic exchange with blockchain platform 140 and another portion of the electronic exchange with blockchain platform 445.

Returning to the football wager example, user 112*a* may use a first cryptocurrency associated with blockchain platform 140 as collateral, while user 112*b* uses a second cryptocurrency associated with blockchain platform 445 as collateral. By utilizing the capabilities of server computer system 101, neither of users 112 may need to open an account on the other's blockchain platform in order to execute smart protocol 430. Instead, server computer system 101 enables electronic exchanges of the collateral between the two different blockchain platforms. If the two blockchain platforms do not have a capability to perform exchanges directly with each other, then server computer system 101 acts as a "middle-man" to, for example, receive a value of the cryptocurrency from the losing user's blockchain platform and then transfer the received value to the winning user's blockchain platform. In some embodiments, server computer system 101 may utilize a cryptocurrency implemented within server computer system 101 to facilitate the two portions of the electronic exchange.

It is noted that FIG. 4 is merely an example. The illustrated components have been limited to a server computer system and two blockchain platforms for clarity. In other embodiments, additional components may be included, such as user computers, web resources, and networking systems. Although an example of a sports wager has been used throughout the disclosure, various other types of smart protocols are contemplated, such as an agreement between users to exchange media, non-fungible tokens, or other digital items of value while mitigating a risk of one user baking out of the agreement without providing their portion.

The systems described above in FIGS. 1-4 may use a variety of methods for generating a smart protocol. Several such methods for generating and deploying smart protocols are described in FIGS. 5-9.

Turning now to FIG. 5, a flow diagram for an embodiment of a method for generating a smart protocol for execution on a blockchain platform is shown. Method 500 may be performed by a computer system such as server computer system 101 in FIGS. 1-4. For example, server computer system 101 may include (or have access to) a non-transient, computer-readable medium having program instructions stored thereon that are executable by server computer system 101 to cause the operations described with reference to FIG. 5. Method 500 is described below using system 100 of FIG. 1 as an example. References to elements in FIG. 1 are included (e.g., in parentheses) as non-limiting examples.

Method 500 begins in block 510 by providing, by a server computer system (101), a user interface (105) to one or more of a plurality of users (112). For example, users 112 may enter an agreement that involves an electronic exchange of some form of collateral submitted by each of users 112. Collateral may include cryptocurrencies, non-fungible tokens (NFTs), media files, data files, or other forms of digital content that may be exchanged electronically. The agreement may include an exchange of collateral between users 112 (e.g., cryptocurrency for an NFT) or may include conditions of a wager, such that the collateral is distributed among the users based on results of an event or other occurrence. One of users 112, e.g., user 112*a*, may log into an account on server computer system 101 and initiate creation of smart protocol 130. In response, server computer system 101 provides user interface 105 to user 112*a*. User interface 105 may enable user 112*a* to create inputs that establish terms and conditions for execution of smart protocol 130 without requiring user 112*a* to understand a programming language associated with the smart protocol.

At 520, method 500 continues by receiving, by the server computer system (101) via the user interface (105), input specifying terms (110) corresponding to a smart protocol (130) that is to be deployed on a blockchain platform (140). For example, user 112*a* utilizes user interface 105 to generate terms 110 based on an agreement to be entered into with user 112*b*. Terms 110 may include identities of users 112 associated with smart protocol 130 and web resource 115 to be used to identify one or more external data 125. Using the sports wager example, web resource 115 may be a sports web site that includes a page that will be updated with results to a game to be played at a future point in time. External data 125 may correspond to one or more fields of the web page that will be updated after the game has completed with various details about the game, such as a box score that includes a final score for each team and other details. Execution of smart protocol 130 may then be based on a value of external data 125 after the completion of the game.

Method 500 continues at 530 by generating, by the server computer system (101), the smart protocol (130) based on the terms (110) without further input from the plurality of users (112). As illustrated, for example, server computer system 101 takes terms 110 and using libraries and other code generation techniques, generates smart protocol 130 such that smart protocol 130 is compatible with blockchain platform 140. Terms 110 may include one or more data items available from web resource 115, such as a final score for each team. Smart protocol 130 is executable based on a value of external data 125 after web resource 115 is updated after the game completes.

At 540, method 500 proceeds by deploying, by the server computer system (101), the smart protocol (130) to the blockchain platform (140). As shown, for example, server computer system 101 deploys smart protocol 130, after the generating, on blockchain platform 140. The deployment may include copying some or all generated code on a computer system associated with blockchain platform 140. The deployment may also prevent further changes from being made to smart protocol 130 by either of users 112, or by any other entity. Accordingly, both of users 112 may be locked into the agreement that is to be enacted by smart protocol 130 once it is deployed, thereby preventing one of users 112 from reneging on the agreement. As shown, performance of smart protocol 130 includes two sub-blocks.

At sub-block 544, performing the smart protocol (130) causes the web resource (115) to be monitored to determine the value of the external data (125). Returning to the sports example, web resource 115 may be a web page that will post box scores for a game on which users 112 have wagered. Final values posted to web resource 115 are posted after the game completes. Until the completion of the game, performance of smart protocol 130 may cause server computer system 101 and/or blockchain platform 140 to monitor external data 125 on web resource 115 that are indicated by smart protocol 130 (e.g., final scores for each team).

At sub-block 548, performing the smart protocol (130), in response to the value of the external data (125) corresponding to a first value, executes to cause an electronic exchange (145) to be performed on the blockchain platform (140). For example, in response to the final score being posted to web resource 115, server computer system 101 may cause blockchain platform 140 to execute smart protocol 130 based on terms 110. Terms 110 may state that user 112a receives the provided collateral if Team A wins, and user 112b receives the collateral otherwise. If Team A's score is greater than Team B's score, then execution of smart protocol causes the wagered collateral to be transferred to an account of user 112a. Otherwise the wager goes to an account of user 112b.

It is noted that the method of FIG. 5 includes elements 510-548. Method 500 may end in sub-block 548 or may repeat some or all blocks of the method. For example, method 500 may return to sub-block 544 to continue to monitor web resource 115 for an amount of time to detect if additional updates are made (e.g., a correction to the final scores). In some cases, method 500 may be performed concurrently with other instantiations of the method. For example, multiple parties may enter into similar wagers for a same sporting event, these parties using the disclosed system to generate respective smart protocols to implement their wagers.

Figure 6:
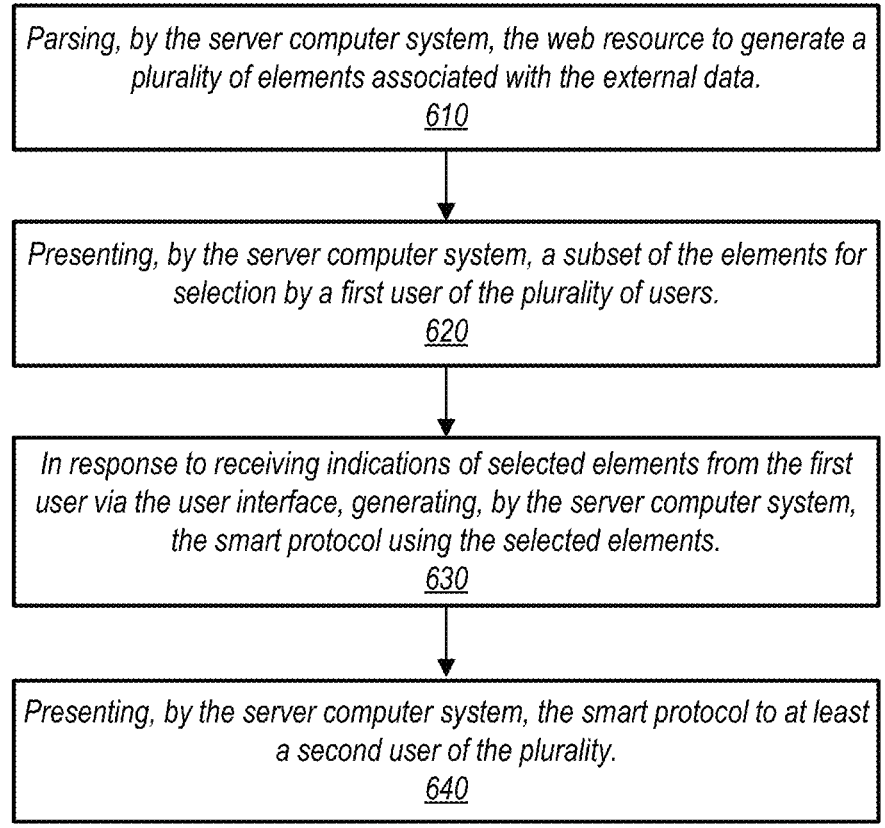
FIG. 6 depicts a flow diagram of an embodiment of a method for generating a smart protocol using elements parsed from a web resource.

Proceeding now to FIG. 6, a flow diagram of a method for parsing a web resource for use in a smart protocol is illustrated. In a similar manner as method 500, method 600 may be performed by a computer system such as server computer system 101 in FIGS. 1-4. The computer system may, for example, include (or have access to) a non-transient, computer-readable medium having program instructions stored thereon that are executable by the computer system to cause the operations described with reference to FIG. 6. In some embodiments, method 600 may correspond to actions that occur as a part of block 520 in method 500. Method 600 is described below using systems 100 and 200 of FIGS. 1 and 2, respectively, as examples. References to elements in FIGS. 1 and 2 are included (e.g., in parentheses) as non-limiting examples.

Method 600 begins at 610 by parsing, by a server computer system (101), a web resource (115) to generate a plurality of elements (218) associated with the external data (125). For example, user 112a of users 112 may be asked, via user interface 105a, for a web resource 115 that can provide one or more external data 125 for use with executing smart protocol 130. Server computer system 101 may receive from user 112a, via user interface 105a, a URL (or other identifying information) to web resource 115. Server computer system 101 may then retrieve information provided at the URL, such as HTML code corresponding to web resource 115 and parse through the information to identify various fields corresponding to elements 218.

Method 600 continues at 620 by presenting, by the server computer system (101), a subset of the plurality of elements (218) for selection by a first user (112a) of the plurality of users (112). As illustrated, for example, after parsing the information from web resource 115 to identify elements 218, server computer system 101 arranges ones of elements 218 that may be useful for executing smart protocol 130. In the sports wager example, some of elements 218 may correspond to information that is not related to the game, such as a counter for page views of the provided URL. Accordingly, server computer system 101 may place the relevant ones of elements 218 into a table or other easily viewable format for display via user interface 105a. User 112a may view the presented elements 218 and select one or more that are of interest for the wager with user 112b. User interface may further include operators or other forms of conditions that may be applied to elements 218.

For example, for an over/under wager, user 112a may utilize user interface 105a to build a condition that states "if Team A score plus Team B score is greater than thirty, then user 112a wins, otherwise user 112b wins." Team A score and Team B score may correspond to two different ones of elements 218, while "plus" and "greater than" are operators selectable from user interface 105a. The total of "thirty" may be a text box in which user 112a can enter the desired combined score for the wager. User interface 105a may allow user 112a to enter as many conditions related to the presented elements 218 as user 112a desires. If more than one condition is presented, user 112a may further identify a particular portion of collateral to be wagered by each of users 112 for each condition.

At 630, method 600 continues by, in response to receiving indications of selected elements (218) from the first user (112a) via the user interface (105a), generating, by the server computer system (101), the smart protocol (130) using the selected elements (218). As shown, for example, after user 112a selects particular ones of elements 218 and constructs one or more desired conditions for the selected elements 218, user 112a may submit these as terms 110 to server computer system 101. Server computer system 101 may then use terms 110 to generate code corresponding to smart protocol 130. Some or all of this code may be in a native format associated with blockchain platform 140 on which smart protocol 130 will be deployed. In some embodiments, a portion of the code will be generated in a language usable by server computer system 101 to support the deployment and/or performance of smart protocol 130 on blockchain platform 140.

Method 600 proceeds at 640 by presenting, by the server computer system (101), the smart protocol (130) to at least a second user (112b) of the plurality of users (112) for approval. For example, after smart protocol 130 is generated, server computer system 101 may send details of the conditions included in smart protocol 130 to user 112b via user interface 105b. In some embodiments, rather than sending the generated code, server computer system 101 sends details of smart protocol 130 in a format that can be presented on user interface 105b in a manner that is easy for someone without programming skills to understand, such as a graphical representation and/or using plain English terminology. In other embodiments, smart protocol 130 may be sent as the generated code and user interface 105b may interpret and present smart protocol 130 in the easy-to-understand manner. User interface 105b may further provide a check box, button, or other element allowing user 112b to approve or disapprove smart protocol 130. User interface 105*b* may further require user credentials to authenticate that the person utilizing user interface 105*b* is actually user 112*b*. As previously disclosed, user interface 105*b* may further provide user 112*b* one or more ways of communicating desired changes if user 112*b* disapproves of the current state of smart protocol 130, thus allowing user 112*a* to make such changes if they agree. Smart protocol 130 may then be regenerated and sent back to user 112*b* for approval. After receiving approval from user 112*b*, server computer system 101 may deploy smart protocol 130 to blockchain platform 140.

It is noted that method 600 includes elements 610-640. Method 600 may end in block 640 or may repeat some or all blocks of the method. For example, method 600 may return to block 620 for changes if user 112*b* disapproves of a presented version of smart protocol 130. Like method 500, method 600 may be performed concurrently with other instantiations of the method. Variations of method 600 are contemplated. For example, blocks 630 and 640 may be reversed such that conditions for executing smart protocol 130 are presented to user 112*b* for approval prior to server computer system 101 generating any code.

Figure 7:
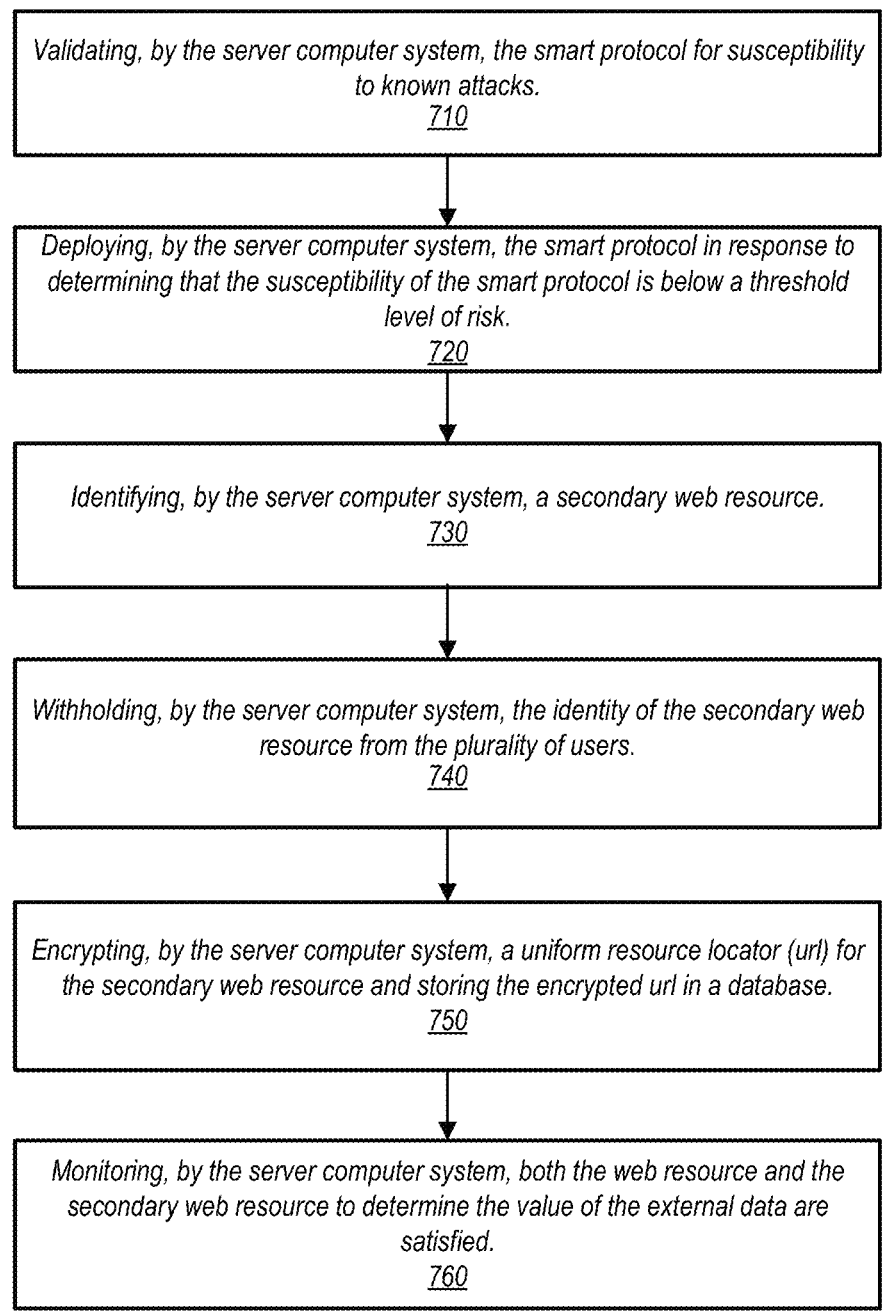
FIG. 7 illustrates a flow diagram of an embodiment of a method for deploying a smart protocol.

Moving to FIG. 7, a flow diagram of a method for validating a smart protocol for susceptibility to known attacks is shown. Method 700 may be performed, in a similar manner as methods 500 and 600, by a computer system such as server computer system 101 in FIGS. 1-4. In some embodiments, method 700 may correspond to actions that occur as a part of block 530 in method 500. Systems 100 and 300 of FIGS. 1 and 3, respectively, are used in the following paragraphs as examples for performing method 700. References to elements in FIGS. 1 and 3 are included (e.g., in parentheses) as non-limiting examples.

Method 700 begins at 710 by validating, by a server computer system (101), a smart protocol (130) for susceptibility to known attacks. For example, server computer system 101 may validate smart protocol 130 by validating the generated code or by validating the terms 110 received from user 112*a*. In some cases, terms 110, including the provided web resource 115 and any provided conditions generated by user 112*a*, may provide sufficient detail to determine if smart protocol 130 may have an unacceptable level of susceptibility to various know attacks from a dishonest second party (e.g., user 112*b*) or a third party not associated with smart protocol 130. In other cases, generated code may be used to make the determination of susceptibility. the validation may be performed on server computer system 101 may further determine whether smart protocol 130 has an unacceptable level of susceptibility to common bugs or issues that, while not intentionally malicious, may still result in a failure to distribute the collateral fairly. The susceptibility of smart protocol 130 to attacks and bugs may be quantified into one or more values that are then compared to a threshold level. This threshold may be established, for example, by a system administrator associated with server computer system 101.

At 720, method 700 continues by deploying, by the server computer system (101), the smart protocol (130) in response to determining that the susceptibility of the smart protocol (130) is below a threshold level of risk. For example, if the susceptibility values fail to reach a threshold level of risk (e.g., smart protocol 130 is considered sufficiently safe from attacks and bugs), then smart protocol 130 is deployed to blockchain platform 140. As previously stated, after smart protocol 130 is deployed, no further changes are allowed and smart protocol 130 will be executed after conditions specified in smart protocol 130 have been met. If, however, smart protocol 130 meets or exceeds the threshold level of risk, then deployment of smart protocol 130 is delayed.

Method 700 proceeds at 730 by identifying, by the server computer system (101), a secondary web resource (315). In some embodiments, server computer system 101 may be capable of mitigating the determined risk level of smart protocol 130 without further input from either of users 112. One technique for mitigating the risk level includes selecting a secondary web resource as a back-up to web resource 115. If the susceptibility of smart protocol 130 is related to a susceptibility of web resource 115 to an attack, then server computer system 101 identifies web resource 315 as an alternative source for external data that is included in terms 110. Accordingly, web resource 315 may be selected based on a capability of web resource 315 to provide the same elements 318 as were selected for use in smart protocol 130. After web resource 315 is identified and selected by server computer system 101, web resource 315 may be included in smart protocol 130 as an approved source of information for executing smart protocol 130. Smart protocol 130 may then be deployed.

Method 700 continues at 740 by withholding, by the server computer system (101), the identity of the web resource (315) from the plurality of users (112). To mitigate a risk of either of users 112 attacking web resource 315, for example, server computer system 101 may withhold an identity of web resource 315 from both users 112. In some embodiments, users 112 may be notified that a secondary web resource has been selected as a precaution, but no information specific to web resource 315 is provided. In other embodiments, there may be no indications of the use of web resource 315 made to either one of users 112.

At 750, method 700 continues by encrypting, by the server computer system (101), a uniform resource locator (URL) for the web resource (315) and storing the encrypted URL in a database. As illustrated, for example, in order to save the identity of web resource 315, server computer system 101 may encrypt a URL that points to web resource 315 and then save the encrypted URL within a database associated with server computer system 101 and/or blockchain platform 140. Web resource 115 may be monitored initially, and web resource 315 may only accessed if access to web resource 115 is unavailable or if there is otherwise an indication of risk with web resource 115. In such cases, server computer system 101 and/or blockchain platform 140 may retrieve the encrypted URL for web resource 315, decrypt the URL and then access web resource 315 in order to monitor external data 125 from this secondary source.

At block 760, the method includes monitoring, by server computer system 101, both web resource 115 and web resource 315 to determine the value of external data 125. After smart protocol 130 is deployed to blockchain platform 140, server computer system 101 and/or blockchain platform 140 monitor both web resources 115 and 315 to determine if a condition for executing smart protocol 130 has been met. Returning to the sports wager example, a condition for executing smart protocol 130 may be an indication that the game has completed and box scores have been updated on both of web resources 115 and 315. After these box scores are available, smart protocol 130 may first use web resource 115 to access external data 125 in order to execute smart protocol 130. If, however, external data 125 is unavailable from web resource 115 (e.g., web resource 115 is under a denial-of-service attack), then external data 125 may be accessed from web resource 315. Smart protocol 130 is executed and the collateral is fairly distributed. To the appropriate ones of users 112.

It is noted that method 700 includes elements 710-760. Method 700 may end in block 760 or may repeat some or all blocks of the method. Method 700 may, for example, return to block 730 to identify a third web resource as an additional precaution against an attack. Server computer system may identify additional web resources, for example, in response to an indication of an increase of attacks on web resources similar to ones identified for the smart protocol. Variations of method 700 are contemplated. For example, block 740 may be performed concurrently while blocks 750 and 760 are performed.

Figure 8:
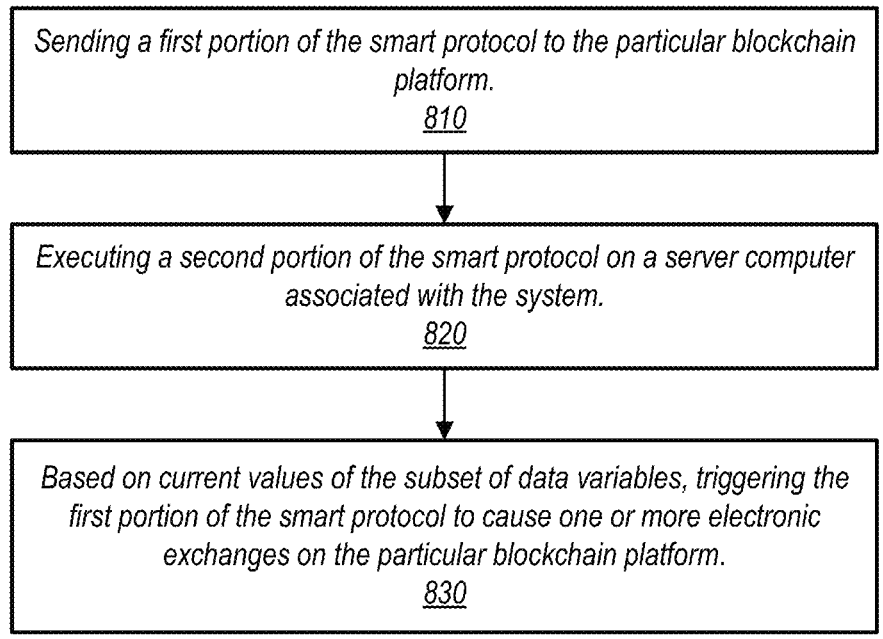
FIG. 8 shows a flow diagram of an embodiment of a method for deploying a first portion of a smart protocol on a blockchain platform and executing a second portion of the smart protocol on a server computer system.

Turning to FIG. 8, a flow diagram of a method for performing different portions of a smart protocol on a server computer system and a blockchain platform is depicted. In a manner similar to the previously described methods, method 800 may be performed, by a computer system such as server computer system 101 in FIGS. 1-4. In some embodiments, method 700 may correspond to actions that occur as a part of block 540 in method 500. Systems 100 and 400 of FIGS. 1 and 4, respectively, are used in the following paragraphs as examples for performing method 800. References to elements in FIGS. 1 and 4 are included (e.g., in parentheses) as non-limiting examples.

Method 800 begins at block 810 by sending, by a server computer system (101), a first portion of a smart protocol (430*a*) to a blockchain platform (140). As illustrated, for example, smart protocol 430 includes multiple portions, including smart protocol 430*a* and 430*b*. Smart protocol 430*a* includes the portion of code for execution on blockchain platform 140, so server computer system 101 deploys smart protocol 430*a* to blockchain platform 140. This portion may include conditions for fair distribution of collateral between users 112 when smart protocol 430 is executed. In some embodiments, a third portion, smart protocol 430*c*, may be included for execution on a different blockchain platform, such as blockchain platform 445. This third portion may be used to complete an electronic exchange of the collateral between blockchain platform 140 and blockchain platform 445.

At 820, method 800 proceeds by executing a second portion of the smart protocol (430*b*) on server computer system 101. For example, Smart protocol 430*b* may include code to be executed on server computer system 101. For example, in some embodiments server computer system 101 may monitor web resource 115 (and if applicable, web resource 315) to determine when a condition for triggering smart protocol 430*a* (and in appropriate cases, smart protocol 430*c*) has been met.

Method 800 continues at 830 by, based on current values of a subset of data variables, triggering the smart protocol (430*a*) to cause one or more electronic exchanges (145) on the blockchain platform (140). As shown, e.g., server computer system 101 may use smart protocol 430*b* to determine whether the condition for triggering smart protocol 430*a* has been met. After server computer system 101 determines that the condition for triggering smart protocol 430*a* has been met, server computer system 101 causes blockchain platform 140 to execute smart protocol 430*a*. The execution of smart protocol 430*a* may cause one or more electronic exchanges to occur, thereby distributing collateral among users 112. In some cases, at least one of the electronic exchanges may include an exchange between blockchain platforms 140 and 445. For example, user 112*a* may use collateral associated with blockchain platform 140 while user 112*b* uses collateral associated with blockchain platform 445. Accordingly, when smart protocol is to be executed in response to the trigger condition, server computer system 101 may cause the respective portions, smart protocol 430*a* and 430*c*, to be executed. In some embodiments, server computer system 101, using smart protocol 430*b*, may further facilitate the exchange between blockchain platforms 140 and 445, e.g., by acting as middle-man.

Method 800, it is noted, includes elements 810-830. Method 800 may end in block 830 or may repeat some or all blocks of the method. Method 800 may, for example, repeat block 810 to deploy a plurality of portions of a smart protocol to a plurality of respective blockchain platforms. Variations of method 700 are contemplated. For example, blocks 810 and 820 may be performed concurrently.

Turning now to FIG. 9, a flow diagram for an embodiment of another method for generating a smart protocol for execution on a blockchain platform is shown. Method 900 may be performed by a computer system such as server computer system 101 in FIGS. 1-4. For example, server computer system 101 may include (or have access to) a non-transient, computer-readable medium having program instructions stored thereon that are executable by server computer system 101 to cause the operations described with reference to FIG. 9. Method 900 is described below using systems 100 and 200 of FIGS. 1 and 2, respectively, as examples. References to elements in FIGS. 1 and 2 are included (e.g., in parentheses) as non-limiting examples.

Method 900 begins at 910 by providing, by a server computer system (101), a user interface (105) to one or more of a plurality of users (112), enabling a first of the plurality of users (e.g., user 112*a*) to specify terms (110) for a smart protocol (130) that executes on a blockchain platform (140). As illustrated, for example, terms 110 may include identifiers for users 112 and web resource 115 that is to be used to identify one or more external data 125. Execution of smart protocol 130 may be based on a value of external data 125. As previously described, users 112 may enter an agreement that involves an electronic exchange of some form of collateral submitted by each of users 112. The agreement may include an exchange of different types of collateral between users 112, or may include conditions of a wager. User 112*a* may log into an account on server computer system 101 and initiate creation of smart protocol 130 utilizing user interface 105*a*. User interface 105*a* may enable user 112*a* to generate terms for executing smart protocol 130. User interface 105*a* may provide tools that enable user 112*a* to generate terms 110 for smart protocol 130 without user 112*a* understanding a programming language associated with blockchain platform 140.

Method 900 continues at 920 by identifying, by the server computer system (101), one or more data variables available from the web resource (115). As depicted, for example, these data variables, e.g., elements 218 in FIG. 2, may include variables defined in code corresponding to web resource 115. For example, web resource 115 may be a web page that is updated at a particular point in time with values for elements 218. Using the sports wager example, web resource 115 may be sports news web site and elements 218 correspond to various values for a box score of one or more games. In a different embodiment, web resource 115 may be an investing web site and elements 218 correspond to current values for various stocks and bonds. Server computer system 101 may then retrieve information provided at the URL, such as HTML code corresponding to web resource 115 and parse through the information to identify various fields corresponding to elements 218. After parsing elements 218 from web resource 115, server computer system 101 may place relevant ones of elements 218 into a table or other easily viewable format for display via user interface 105*a*. As shown in FIG. 2, elements 218*b*, 218*b*, 218*d*, and 218*e* are presented to user 112*a* via user interface 105*a*.

Method 900 proceeds at 930 by, based on the specified terms (110) and available data variables (e.g., ones of elements 218), generating, by the server computer system (101), the smart protocol (130) using no further input from the plurality of users (112). For example, server computer system 101 uses terms 110 and ones of elements 218 that were selected by user 112*a* to generate smart protocol 130 such that smart protocol 130 is executable on blockchain platform 140. Libraries and other code generation techniques may be used by server computer system 101 to generate smart protocol 130. Smart protocol 130 is executable based on a value of external data 125 after web resource 115 is updated after the game completes. As part of the generation of smart protocol 130, server computer system 101 may further query user 112*b* for approval of terms 110. As shown, server computer system 101 presents smart protocol 130 on user interface 105*b* in a manner that user 112*b* may be capable of understanding terms 110 without needing knowledge of a programming language associated with blockchain platform 140. Method 900 may remain in block 930 until approval is received from user 112*b*.

At 940, method 900 continues by deploying, by the server computer system (101), the smart protocol (130) to a blockchain platform (140) for execution. E.g., after smart protocol 130 has been generated, server computer system 101 may deploy it on blockchain platform 140. The deployment may include copying some or all of the generated code on blockchain platform 140. The deployment may also prevent further changes from being made to smart protocol 130 by either of users 112, or by any other entity. Accordingly, users 112 may be confident that the agreement that is to be enacted by smart protocol 130 is executed per the agreed terms 110. As shown, deploying smart protocol 130 includes two sub-blocks.

At sub-block 944, performing the smart protocol (130) compares current values of at least one of the available data variables (e.g., one of elements 218) from the web resource (115) to respective ones of the specified terms (110). Terms 110, for example, may include an indication of a point in time (e.g., a date and time of day) or other condition (e.g., completion of an event) that will trigger execution of smart protocol 130. Until the trigger is detected, performance of smart protocol 130 may cause server computer system 101 and/or blockchain platform 140 to monitor external data 125 on web resource 115 that are indicated by terms 110 in smart protocol 130.

Performance of smart protocol 130 at sub-block 948, based on the comparing, causes one or more electronic exchanges (145) on the particular blockchain platform (140). As shown, for example, after detecting that a current value read from web resource 115 matches the trigger value from terms 110, server computer system 101 may cause blockchain platform 140 to execute smart protocol 130 based on terms 110. Terms 110 may indicate that collateral from each of users is exchanged after the trigger condition occurs. For example, smart protocol 130 may correspond to an agreement for user 112*a* to give user 112*b* a particular amount of cryptocurrency in exchange for a particular NFT being purchased by user 112*b*. The trigger condition of terms 110 may be the availability of the NFT in an account of user 112*b*. After user 112*b* acquires the NFT and transfers the NFT into their account, web resource 115 may update a value that provides an indication of this transfer. The updating of this value triggers server computer system 101 to cause blockchain platform 140 to execute smart protocol 130.

It is noted that the method of FIG. 9 includes elements 910-948. Method 900 may end in sub-block 948 or at least some blocks of the method may be repeated. For example, method 900 may remain in sub-block 944 to monitor web resource 115 to detect the trigger event. In some embodiments, smart protocol may include multiple trigger events, each event triggering a different electronic exchange.

It is contemplated that methods 500 through 900 may be performed concurrently with other ones of the methods, and/or with other instantiations of the same method. For example, server computer system 101 may perform smart protocol generation services for multiple different sets of entities. In some cases, multiple sets of entities may generate similar smart protocols for similar events.

Figure 10:
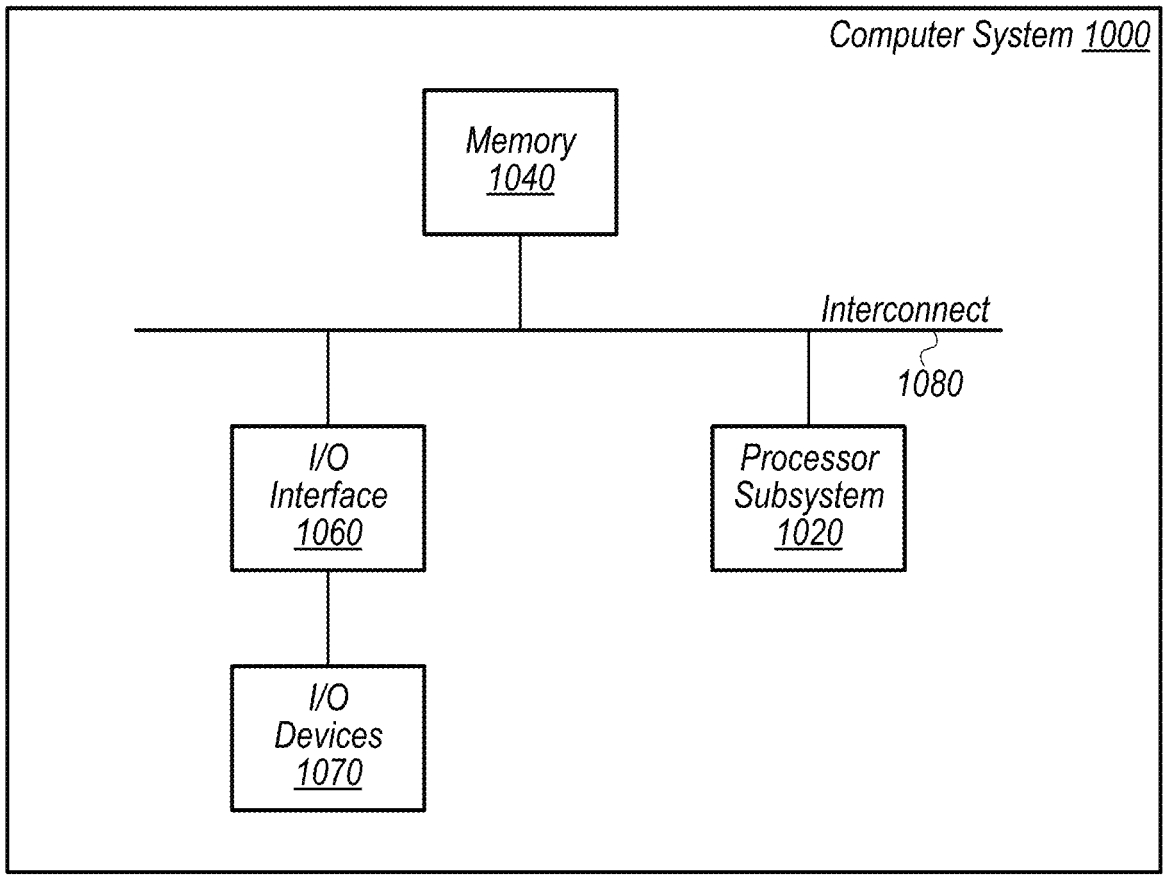
FIG. 10 depicts a block diagram of an embodiment of a computer system that may be used to implement one or more embodiments of the disclosed system.

In the descriptions of FIGS. 1-9, various computer systems for implementing the disclosed techniques have been disclosed, such as server computer system 101 in FIGS. 1-4, and user computers 212*a* and 212*b* in FIG. 2. In addition, blockchain platforms 140 and 445 in FIGS. 1, 3, and 4 may be implemented using one or more computer systems. These computer systems may be implemented in a variety of manners. FIG. 10 provides an example of a computer system that may correspond to one or more of the disclosed systems.

Referring now to FIG. 10, a block diagram of an example computer system 1000 is depicted. Computer system 1000 may, in various embodiments, implement one or more of the disclosed computer systems, such as server computer system 101 and/or blockchain platform 140 in FIG. 1. Computer system 1000 includes a processor subsystem 1020 that is coupled to a system memory 1040 and I/O interfaces(s) 1060 via an interconnect 1080 (e.g., a system bus). I/O interface(s) 1060 is coupled to one or more I/O devices 1070. Computer system 1000 may be any of various types of devices, including, but not limited to, a server computer system, personal computer system, desktop computer, laptop or notebook computer, mainframe computer system, server computer system operating in a datacenter facility, tablet computer, handheld computer, smartphone, workstation, network computer, connected vehicle, etc. Although a single computer system 1000 is shown in FIG. 10 for convenience, computer system 1000 may also be implemented as two or more computer systems operating together.

Processor subsystem 1020 may include one or more processor circuits. In various embodiments of computer system 1000, multiple instances of processor subsystem 1020 may be coupled to interconnect 1080. In various embodiments, processor subsystem 1020 (or each processor unit within 1020) may contain a cache or other form of on-board memory.

System memory 1040 is usable to store program instructions executable by processor subsystem 1020 to cause computer system 1000 perform various operations described herein, including, for example, any of methods 500-900. System memory 1040 may be implemented using any suitable type of memory circuits including, for example, different physical, non-transient, computer-readable media, such as hard disk storage, floppy disk storage, removable disk storage, flash memory, random access memory (RAM—SRAM, EDO RAM, SDRAM, DDR SDRAM, LPDDR SDRAM, etc.), read-only memory (PROM, EEPROM, etc.), and so on. Memory circuits in computer system 1000 are not limited to primary storage such as system memory 1040. Rather, computer system 1000 may also include other forms of storage such as cache memory in processor subsystem 1020 and secondary storage in I/O devices 1070 (e.g., a hard drive, storage array, etc.). In some embodiments, these other forms of storage may also store program instructions executable by processor subsystem 1020.

I/O interfaces 1060 may be any of various types of interfaces configured to couple to and communicate with other devices, according to various embodiments. In one embodiment, I/O interface 1060 is a bridge chip (e.g., Southbridge) from a front-side to one or more back-side buses. I/O interfaces 1060 may be coupled to one or more I/O devices 1070 via one or more corresponding buses or other interfaces. Examples of I/O devices 1070 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 1070 includes a network interface device (e.g., configured to communicate over Wi-Fi®, Bluetooth®, Ethernet, etc.), and computer system 1000 is coupled to a network via the network interface device.

The present disclosure includes references to an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

What is claimed is:

1. A method, comprising:
   providing, by a server computer system, a user interface to one or more of a plurality of users;
   receiving, by the server computer system via the user interface, input specifying terms corresponding to a smart protocol that is to be deployed on a particular blockchain platform, the specified terms including the plurality of users associated with the smart protocol and a web resource to be used to identify one or more external data, wherein an execution of the smart protocol is based on a value of the external data;
   based on the specified terms, identifying, by the server computer system, available content from the web resource that is usable in the smart protocol;
   using at least a portion of the identified content, generating, by the server computer system without further input from the plurality of users, the smart protocol that is executable based on the value of the external data, wherein the smart protocol is configured to:
      cause the web resource to be monitored to determine the value of the external data; and
      in response to the value of the external data corresponding to a first value, execute to cause an electronic exchange to be performed on the particular blockchain platform; and
   deploying, by the server computer system, the smart protocol to the particular blockchain platform.

2. The method of claim 1, wherein the identifying available content includes:
   parsing, by the server computer system, the web resource to generate a plurality of elements associated with the external data; and
   presenting, by the server computer system, a subset of the elements for selection by a first user of the plurality of users.

3. The method of claim 2, further comprising:
   receiving indications of selected elements from the first user via the user interface; and
   wherein the at least a portion of the identified content includes the selected elements.

4. The method of claim 2, further comprising:
   presenting, by the server computer system, the smart protocol to at least a second user of the plurality for approval; and
   wherein the deploying is based on receiving approval from the second user.

5. The method of claim 1, wherein deploying the smart protocol on the particular blockchain platform comprises:
   validating, by the server computer system, the smart protocol for susceptibility to known attacks; and wherein the deploying is based on determining that the susceptibility of the smart protocol is below a threshold level of risk.

6. The method of claim 1, wherein deploying the smart protocol on the particular blockchain platform includes providing a bridge to execute the electronic exchange from the particular blockchain platform to a different blockchain platform.

7. The method of claim 1, further comprising:
identifying, by the server computer system, a secondary web resource; and
monitoring, by the server computer system, both the web resource and the secondary web resource to determine the value of the external data.

8. The method of claim 7, further comprising withholding, by the server computer system, an identity of the secondary web resource from the plurality of users.

9. The method of claim 1, wherein the smart protocol is further configured to, in response to the value of the external data corresponding to a second value, execute to cause a different electronic exchange to be performed on the particular blockchain platform.

10. The method of claim 1, further comprising:
determining, by the server computer system, a risk score for at least one of the plurality of users; and
modifying the smart protocol based on the risk score.

11. A computer-readable, non-transient memory including instructions that when executed by a computer system, cause the computer system to perform operations including:
providing a user interface to one or more of a plurality of users, enabling a first of the plurality of users to specify terms for a smart protocol that executes on a particular blockchain platform, the terms including identifiers for the plurality of users and a web resource to be used to identify one or more external data, wherein an execution of the smart protocol is based on a value of the external data;
based on the specified terms, identifying available content from the web resource that is usable in the smart protocol;
based on the specified terms and the available content, generating the smart protocol using no further input from the plurality of users, wherein the smart protocol is configured to:
cause the web resource to be monitored to determine the value of the external data; and
in response to the value of the external data corresponding to a first value, execute to cause an electronic exchange to be performed on the particular blockchain platform; and
deploying the smart protocol to the particular blockchain platform for execution.

12. The computer-readable, non-transient memory of claim 11, further comprising:
presenting a subset of available data variables from the identified content for selection by the first user; and
receiving, from the first user, indications of selected ones of the available data variables; and
wherein the generating the smart protocol includes using the selected data variables.

13. The computer-readable, non-transient memory of claim 11, further comprising:
presenting the generated smart protocol to at least a second user of the plurality of users for approval; and
wherein the deploying is based on receiving approval from the second user.

14. The computer-readable, non-transient memory of claim 11, further comprising analyzing a susceptibility of the generated smart protocol to known operational issues.

15. The computer-readable, non-transient memory of claim 11, further comprising modifying the smart protocol using an available risk score for at least one of the plurality of users.

16. A system comprising:
a processor circuit; and
a memory circuit including instructions that when executed by the processor circuit, cause the system to perform operations including:
providing, to a first user of a plurality of users, an interface for specifying terms for a smart protocol to be executed on a particular blockchain platform, the terms including identifiers for the plurality of users and a web resource that provides respective values for a plurality of data variables;
using the specified terms and a subset of the plurality of data variables, identifying available content from the web resource that is usable in the smart protocol;
using at least a portion of the identified content, generating the smart protocol, wherein the system is configured to generate the smart protocol with no further input from the plurality of users, and wherein the smart protocol is configured to:
cause the web resource to be monitored to determine current values of the plurality of data variables; and
in response to the respective value of a particular one the plurality of data variables corresponding to a first value, execute to cause an electronic exchange to be performed on the particular blockchain platform; and
deploying the smart protocol, including:
sending a first portion of the smart protocol to the particular blockchain platform; and
executing a second portion of the smart protocol on a server computer associated with the system.

17. The system of claim 16, wherein deploying the smart protocol includes providing a bridge to execute at least one of a plurality of electronic exchanges from the particular blockchain platform to a different blockchain platform.

18. The system of claim 16, wherein the operations further include:
identifying a secondary web resource that provides similar values for the plurality of data variables; and
monitoring both the web resource and the secondary web resource to determine current values of the data variables.

19. The system of claim 18, wherein the operations further include:
withholding an identity of the secondary web resource from the plurality of users; and
encrypting a uniform resource locator (URL) for the secondary web resource and storing the encrypted URL in a database.

20. The system of claim 16, wherein the operations further include providing the interface to a different user of the plurality of users, wherein the providing includes, after the smart protocol has been generated, presenting the generated smart protocol to the different user for use with different terms.

* * * * *